Patented Mar. 7, 1939

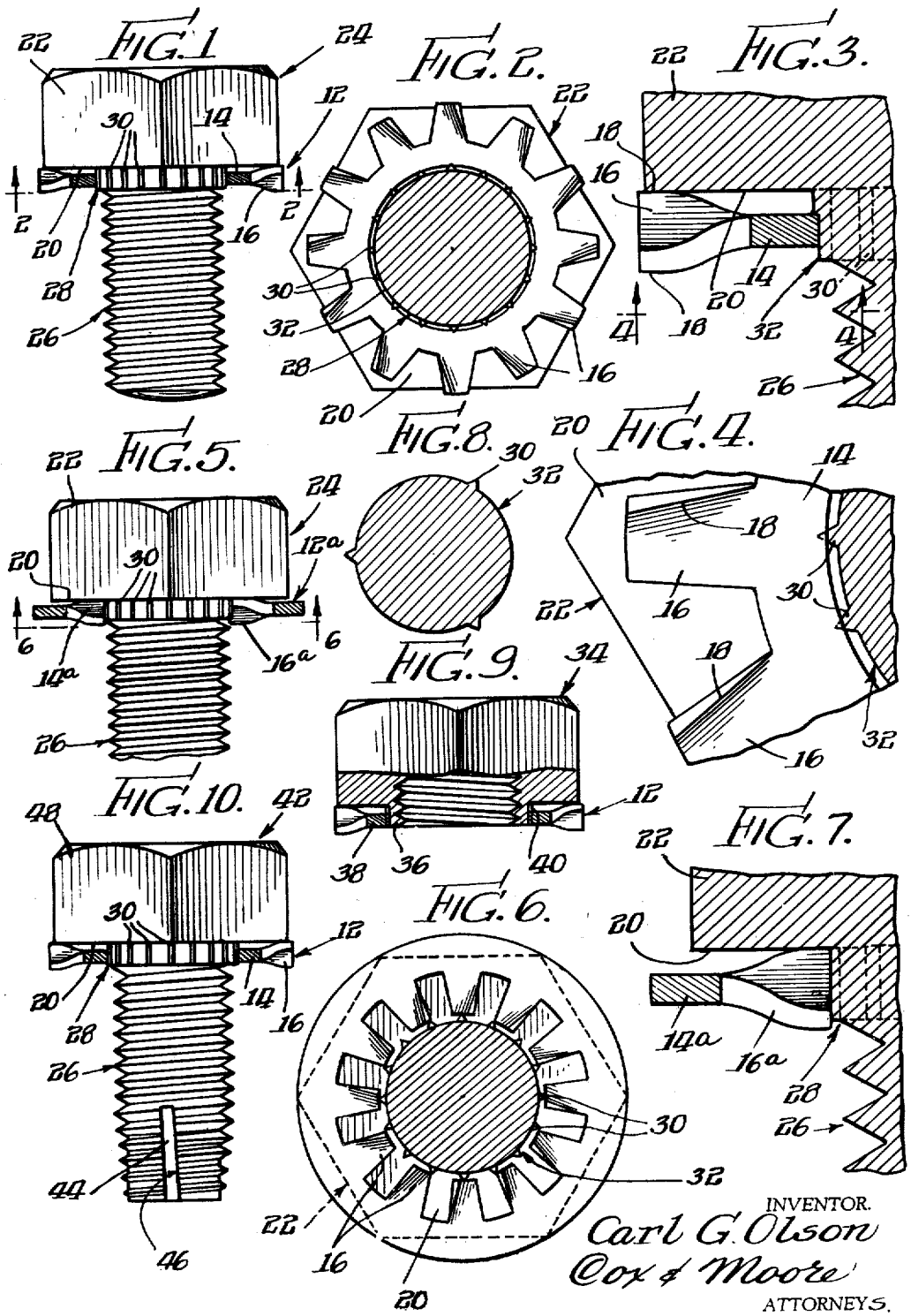

2,150,126

UNITED STATES PATENT OFFICE 2,150,126

FASTENER UNIT

Carl G. Olson, Chicago, Ill., assignor to Illinois Tool Works, Chicago, Ill., a corporation of Illinois Application October 22, 1938, Serial No. 236,525

4 Claims. (Cl. 85—50)

This invention relates generally to preassembled threaded fasteners and lock washers, and more particularly to the combination, with the underside of a rotary threaded clamping member such as a screw head or nut, of a lock washer frictionally engaging a peripheral section of the clamping member, and to methods whereby the preassembly of said elements may be effectively produced.

Preassembling lock washers and screws, or lock washers and nuts, prior to the shipment thereof to the user, contributes materially to the ease and speed with which the fasteners may be ultimately applied to the work. For example, in mass production industries where screws and lock washers are extensively employed, it has been the practice to manually assemble a lock washer with a screw and then apply this assembly to the work. This procedure has resulted in considerable loss of lock washers, because of the difficulty of manually manipulating such small articles, and has resulted in the expenditure of considerable time and effort. The assemblies and methods of producing them, as herein contemplated, enable the shipment and delivery of lock washers and fasteners as combined units to the point of destination where these units are actually to be applied to the work.

More specifically, the present invention contemplates assemblies or units, as specified above, wherein the inner margin of the lock washer frictionally bears against the complementary peripheral portion of the screw shank, or the complementary annular shoulder of a nut, whereby these parts are held together as a preassembled unit, with the lock washer positioned in operative relation to the clamping surface of the threaded fastener.

Still more specifically, the invention contemplates units and methods of producing them, as referred to above, wherein circumferentially spaced peripheral sections of the screw shank cooperate with the inner marginal portion of the lock washer in securing the parts together as preassembled units.

The present invention contemplates methods whereby lock washers and peripheral surface portions in the vicinity of the clamping surface of a screw head or nut may be relatively shifted in an axial direction so as to cause frictional gripping of complementary portions of the parts, and thereby present an improved assembly or unit.

It is a further object of the present invention to provide assemblies or units and methods of producing them, as suggested above, whereby to enable lock washers and screws to be assembled after the thread has been cut or rolled upon the screw shank, and to this end the invention contemplates relatively shifting the threaded shank and associated lock washers in such a manner as to force the inner margin of the lock washer upon the peripheral section of the screw shank in the vicinity of the clamping surface of the screw head.

The foregoing and numerous other objects and advantages will be more apparent from the following detailed description when considered in connection with the accompanying drawing, wherein—

Figure 1 is a side elevational view of a preassembled screw and lock washer made in accordance with the present invention, the front half of the lock washer being broken away to more clearly illustrate the manner in which it is held beneath the clamping surface of the screw head by the circumferentially spaced peripheral sections of the screw shank;

Figure 2 is an enlarged transverse sectional view taken along the line 2—2 of Figure 1;

Figure 3 is an enlarged fragmentary sectional view of the assembled unit of Figure 1 more clearly illustrating the manner in which the inner margin of the body portion of the lock washer frictionally engages the peripheral portion of the screw shank;

Figure 4 is an enlarged sectional view of the disclosure in Figure 3 taken substantially along the line 4—4 of Figure 3 to more clearly illustrate the manner in which the circumferentially spaced protuberances are sheared by the harder lock washer body when the parts are axially shifted in the process of preassembling;

Figure 5 is a view similar to Figure 1, disclosing the manner in which an internally toothed lock washer, as distinguished from the externally toothed lock washer of Figure 1, may be associated with the underside of a screw head;

Figure 6 is an enlarged sectional view taken substantially along the line 6—6 of Figure 5;

Figure 7 is a fragmentary enlarged sectional view similar to Figure 3 disclosing the manner in which an internal tooth of the lock washer shears its way into holding position upon the screw shank immediately beneath the clamping surface of the screw head;

Figure 8 is a transverse sectional view of a modified screw shank in the vicinity of a screw head disclosing three equally spaced protuberances, as distinguished from the greater number of protuberances shown on the screw shanks of Figures 1 to 5, inclusive;

Figure 9 discloses the manner in which the invention may be applied to nuts, as distinguished from screws, said figure disclosing in partial elevation and partial section a nut having in association with the clamping side thereof a lock washed in which the inner margin frictionally engages the complementary peripheral area of the nut body; and Figure 10 discloses the manner in which this invention may be applied to a thread forming or thread cutting screw, wherein the upper portion of the screw body is sufficiently soft to enable a lock washer to be forced into operative position beneath the clamping surface of the screw head.

Referring now to the drawing more in detail wherein like numerals have been employed to designate similar parts throughout the various figures, it will be seen that this invention contemplates the preassembly with screw heads and nuts of a lock washer designated generally by the numeral 12 in Figures 1 to 4, inclusive. While the invention is not limited to the particular lock washer structure shown in the drawing, for purposes of illustration a lock washer of proven practical construction is shown, which includes an annular body of spring stock 14 having spaced along the outer margin thereof a plurality of locking members or prongs 16. These locking members or prongs 16 are so twisted, warped, or deflected as to present oppositely disposed work engaging edges 18, which project beyond the bounding planes of the annular body 14. In order to obtain maximum locking efficiency, I prefer to employ lock washers in which the teeth or edges 18 are adapted to make a line bite into the clamping surface of the screw head 22.

The screw 24, of which the screw head 22 forms a part, has a screw shank portion 26. The peripheral portion of the shank 26 in the vicinity of the clamping surface 20 is designed to frictionally receive the inner periphery of the washer body 14. Thus the screw shank 26 is provided with a lock washer holding section designated generally by the numeral 28.

This lock washer retaining section 28 includes a plurality of lock washer engaging elements or protuberances 30 spaced along and formed integral with an unthreaded shank portion 32. The protuberances 30 may extend longitudinally of the shank portion 32 as illustrated in the drawing, or may be formed in any other suitable manner which will facilitate association therewith of a lock washer.

It will be noted that the diameter of the innermost confines of the lock washer 12 is slightly less than the maximum diameter of the screw shank taken across the protuberances 30. Also, this inner diameter of the lock washer 12 may be slightly greater than the external diameter of the threaded shank 26. Thus, in assembling the lock washer 12 with the screw 24, the shank 26 may be inserted within the aperture of the lock washer 12 and, when the body portion 14 approaches the clamping surface 20, the inner margin of the lock washer will shear or swage its way along the protuberances 30. To facilitate this shearing or swaging, these protuberances are relatively narrow along their outer portions. In other words, by having the outer portions of the protuberances relatively narrow, the resistance to frictional association of the washer body therewith is materially reduced without impairing the ultimate desired frictional grip of the lock washer beneath the screw head. In this manner the lock washer 12 is preassembled with the screw 24 by setting up frictional engagement between the inner marginal surface of the washer body and the complementary peripheral portion of the screw shank in the immediate vicinity of the screw head.

In Figure 5 I have disclosed the manner in which the screw 24 may be preassembled with a lock washer 12a in which the body 14a is associated with a plurality of internal locking members or prongs 16a, as distinguished from the outer locking members or prongs 16 of Figures 1 to 4, inclusive.

The inner diameter of the lock washer 12a is of a size which will permit the relatively harder locking members or prongs 16a to shear their way into frictional holding engagement with the protuberances 30. A sufficient number of protuberances may be provided to insure the holding engagement therewith of a sufficient number of internal lock washer prongs for retaining the lock washer in operative preassembled relation with respect to the underside of the screw head. The manner in which these lock washer prongs or members frictionally engage the protuberances 30 is more clearly illustrated in Figures 6 and 7.

In Figures 1 to 7, inclusive, is disclosed a multiplicity of lock washer holding elements or protuberances 30. In certain instances it may be desirable to employ a lesser number of protuberances, and I have disclosed in Figure 8 three equally spaced protuberances 30 provided along the section 32 of the screw shank. These three equally spaced protuberances will suffice in certain instances to insure the proper preassembled relation to the lock washer and screw head or nut. By having these three equally spaced protuberances, it permits the washer to slightly yield in three directions during the shearing or swaging operation. Thus the resiliency of the washer stock cooperates to urge the inner margin thereof to yieldably and frictionally grip the screw shank at these three locations.

In Figure 9 I have disclosed the application of the present invention to an internally threaded clamping member or nut designated generally by the numeral 34. This nut 34 may be of conventional multisided design and provided at its clamping side with a lock washer retaining section 36. This section 36 extends axially beyond the clamping surface 38 of the nut, but only a sufficient distance to insure the retention of the lock washer 12. The lock washer holding section 36 is provided with a plurality of marginal protuberances 40 similar to the protuberances 30 previously described in connection with the screw 24. The lock washer 12 is associated with the protuberances 40 in exactly the same manner as the lock washer 12 is frictionally associated with the protuberances 30. It may be of interest, in passing, to state that the extension or lock washer holding portion 36 of the nut 34 may be provided at the same time the nut is formed in a conventional header machine. In this manner no additional steps are required other than the making of a die for producing the form of lock washer holding section disclosed in Figure 9. Likewise the lock washer holding protuberances 30 previously described may also be formed at the time the head 22 is formed in the header machine. This is important because it renders the invention capable of being practiced without incurring additional expense or the use of auxiliary, expensive forming or cutting machinery. It of course will be obvious that the internally toothed lock washer 12a may be applied to the nut section 36 of Figure 9 in the same way as the lock washer 12a of Figures 5 to 7, inclusive, is frictionally associated with the screw shank in the immediate vicinity of the clamping side of the screw head 22.

In Figure 10 a thread forming or thread cutting screw 42 is disclosed, which is provided with the protuberances 30. The lock washer 12 is associated with these protuberances in the same manner as the lock washer 12 of Figures 1 to 4, inclusive, is associated with the screw head 22. The entering extremity of the shank on the screw 42 is preferably hardened so as to enable the thread to form its own complementary thread when inserted within the unthreaded aperture of a work piece such as soft iron and soft steel. I prefer to provide this entering portion of the screw shank with a slot 44 which, in traversing the thread convolution, provides a serrated cutting edge 46. This cutting edge serves, when the screw is turned within the work, to actually cut a complementary thread in the work. The upper portion of the screw 42 including its head 48 and the portion of the screw shank in the immediate vicinity of the clamping side of the head must be sufficiently soft to enable the teeth of the lock washer 12 to embed themselves within the clamping side of the screw head, and to enable the inner margin of the lock washer body to shear its way into holding relation with respect to the peripheral portion of the screw shank immediately beneath the clamping side of the screw head.

From the foregoing it will be apparent that my invention provides a simple and expeditious method of securing lock washers and threaded clamping members such as screw heads and nuts in preassembled relation prior to shipping these combined units to the ultimate user. The frictional resistance set up between the inner marginal portion of the internally or externally pronged washers is sufficient to retain the parts in their proper preassembled relation without danger of inadvertent or unauthorized disassembly. It should also be understood that the frictional engagement of the lock washer stock with the periphery of the screw shank is just sufficient to hold the parts in proper assembled relation without interfering with the locking characteristics of the lock washer teeth. When the preassembled lock washer and threaded clamping member are tightened against the work, the spring action of the teeth, coupled with the embedding action of said teeth, serves to insure against retrograde movement or loosening of the clamping member.

By having the inner margin of the lock washer and the complementary lock washer holding portion constructed and arranged as described herein, these parts may be readily forced together under pressure for preassembly purposes. Thus, by having the shank portion of the screw slightly enlarged in the vicinity of the screw head, the shearing or swaging action, which takes place when both parts are moved into assembled relation, may be effected most expeditiously. The invention enables the lock washer to be subjected to a binding or pressure action upon the screw shank without exceeding the elastic limits of the washer stock. In other words, the locker washer is subjected to a predetermined or balanced tension without injury to or fracture of the washer stock.

It will be apparent that this invention is particularly adaptable in the use of lock washers having a continuous annular body portion. In other words, by having a lock washer of continuous annular form, the firm binding or frictional holding of the inner margin of the lock washer against the complementary peripheral holding portion of the screw shank is assured. By employing the method of preassembly described herein, the lock washer is retained in operative relation with respect to the screw head solely by frictional engagement of the inner periphery of the washer with the outer periphery of the screw shank, thus eliminating the necessity of providing a shoulder or other retention means extending radially outward beneath the washer stock.

By having the structural arrangement of the fastener shank as described herein, to-wit, the shank portions with circumferentially positioned protuberances, lock washers of a predetermined size will positively fit complementary fasteners, even though the shank portions of such fasteners slightly vary in diameter. That is, to say, in manufacturing screws and nuts, there are certain manufacturing tolerances well known to those skilled in this particular art, and this invention enables a lock washer to be pressed or forced onto shank portions that may vary in accordance with these manufacturing tolerances. Thus the protuberances are of sufficient radial extent so as to account for these variations in manufacturing tolerances.

Obviously the invention is not limited to the specific structural details disclosed herein, but is capable of other modifications and changes without departing from the spirit and scope of the appended claims.

Having thus described my invention, what I claim as new and desire to secure by Letters Patent is:

1. A lock washer and fastener assembly including a rotary threaded fastener having a clamping surface extending outwardly from the threaded portion thereof, a peripheral lock washer receiving portion extending axially beyond said clamping surface and having a diameter greater than the outer diameter of the thread, and a continuous annular relatively hard lock washer forced axially upon said peripheral receiving portion in tight fitting relation so that it is permanently secured against axial displacement, said lock washer having resilient locking teeth positioned in operative association with said clamping surface.

2. A screw and lock washer assembly consisting of a headed screw having between its head and its thread a peripheral lock washer receiving portion of a greater diameter than the outer diameter of the thread, and a continuous annular relatively hard lock washer forced axially upon said receiving portion in tight fitting relation so that it is permanently secured against axial displacement, said lock washer having resilient locking teeth positioned in operative association with the clamping side of the screw head.

3. A lock washer and fastener assembly including a rotary threaded fastener having a clamping surface extending outwardly from the threaded portion thereof, a peripheral lock washer receiving portion extending axially beyond said clamping surface and having a diameter greater than the outer diameter of the thread, and a continuous annular relatively hard lock washer forced axially upon said peripheral receiving portion in tight fitting relation so that it is permanently secured against axial displacement, said lock washer having resilient locking teeth positioned in operative association with said clamping surface, at least one of said assembled elements having peripherally disposed teeth providing a plurality of spaced contacting areas of limited size.

4. A lock washer and fastener assembly including a rotary threaded fastener having a clamping surface extending outwardly from the threaded portion thereof, a peripheral lock washer receiving portion extending axially beyond said clamping surface and having a diameter greater than the outer diameter of the thread, and a continuous annular relatively hard lock washer forced axially upon said peripheral receiving portion in tight fitting relation so that it is permanently secured against axial displacement, said lock washer having resilient locking teeth positioned in operative association with said clamping surface, said peripheral lock washer receiving portion including a plurality of teeth providing surface contacting areas of limited size.

CARL G. OLSON.

DISCLAIMER 2,150,126.—*Carl G. Olson,* Chicago, Ill. FASTENER UNIT. Patent dated March 7, 1939. Disclaimer filed November 26, 1941, by the assignee, *Illinois Tool Works.*

Hereby enters this disclaimer to claims 1 and 2 in said specification.

[*Official Gazette December 16, 1941.*]

upon said peripheral receiving portion in tight fitting relation so that it is permanently secured against axial displacement, said lock washer having resilient locking teeth positioned in operative association with said clamping surface, at least one of said assembled elements having peripherally disposed teeth providing a plurality of spaced contacting areas of limited size.

4. A lock washer and fastener assembly including a rotary threaded fastener having a clamping surface extending outwardly from the threaded portion thereof, a peripheral lock washer receiving portion extending axially beyond said clamping surface and having a diameter greater than the outer diameter of the thread, and a continuous annular relatively hard lock washer forced axially upon said peripheral receiving portion in tight fitting relation so that it is permanently secured against axial displacement, said lock washer having resilient locking teeth positioned in operative association with said clamping surface, said peripheral lock washer receiving portion including a plurality of teeth providing surface contacting areas of limited size.

CARL G. OLSON.

DISCLAIMER 2,150,126.—*Carl G. Olson,* Chicago, Ill. FASTENER UNIT. Patent dated March 7, 1939. Disclaimer filed November 26, 1941, by the assignee, *Illinois Tool Works.*

Hereby enters this disclaimer to claims 1 and 2 in said specification.

[*Official Gazette December 16, 1941.*]